United States Patent [19]
Busuioc et al.

[11] Patent Number: 6,151,309
[45] Date of Patent: Nov. 21, 2000

[54] SERVICE PROVISION SYSTEM FOR COMMUNICATIONS NETWORKS

[75] Inventors: Marius-Nicolae Busuioc, Ipswich; Richard J. Titmuss, Colchester; Christopher S. Winter, Ipswich, all of United Kingdom

[73] Assignee: British Telecommunications public limited company, London, United Kingdom

[21] Appl. No.: 08/732,321

[22] PCT Filed: Apr. 28, 1995

[86] PCT No.: PCT/GB95/00988

§ 371 Date: Jan. 22, 1997

§ 102(e) Date: Jan. 22, 1997

[87] PCT Pub. No.: WO95/30317

PCT Pub. Date: Nov. 9, 1995

[30] Foreign Application Priority Data

Apr. 28, 1994 [EP] European Pat. Off. .............. 94303092

[51] Int. Cl.[7] ..................................................... H04Q 7/24
[52] U.S. Cl. ........................................... 370/328; 455/422
[58] Field of Search .................................... 370/328, 329, 370/330, 331, 338; 455/422, 432; 379/111, 113, 114, 115, 133

[56] References Cited

U.S. PATENT DOCUMENTS

| | | | |
|---|---|---|---|
| H1641 | 4/1997 | Sharman | 370/329 |
| 5,303,286 | 4/1994 | Wiedman | 370/331 |
| 5,790,536 | 8/1998 | Mahany et al. | 370/338 |
| 5,802,502 | 9/1998 | Gell et al. | 705/37 |

FOREIGN PATENT DOCUMENTS

| | | |
|---|---|---|
| 0 358 408 | 3/1990 | European Pat. Off. . |
| WO A-93 16543 | 8/1993 | WIPO . |
| WO A-94 28683 | 12/1994 | WIPO . |
| WO A-95 15635 | 6/1995 | WIPO . |

OTHER PUBLICATIONS

Griffiths et al, "The Role of Intelligent Software Agents in Integrated Communications Management", British Telecom Technology Journal, vol. 9, No. 3, Jul. 1991, Ipswich, GB, pp. 97–105.

Soderberg, "Evolving an Intelligent Architecture for Personal Telecommunication", Ericsson Review, vol. 70, No. 4, 1993, Stockholm, SE, pp. 156–171, XP 000415352.

Van Den Broek et al, "Functional Models of UMTS and Integration into Future Networks", Electronics and Communication Engineering Journal, vol. 5, No. 3, Jun. 1993, London, GB, pp. 165–172, XP 000377793.

*Primary Examiner*—Min Jung
*Attorney, Agent, or Firm*—Nixon & Vanderhye P.C.

[57] ABSTRACT

A services management system can provide services to a mobile user, via a combination of network platforms. The system uses "Co-operating Intelligent Software Agent" technology in a heterogeneous agent architecture to provide enough flexibility to deal with changing network constraints, for instance as the user moves. In an example, a fixed broadband network might be used in combination with radio transmitters of a mobile network. The agent architecture, involving autonomous agents working co-operatively, forms a layered system using the underlying fixed network for inter-agent communication. In an application, a mobile user might move from a cell of the mobile network which can provide relatively wide bandwidth to one which can only provide limited bandwidth. The service management system can advise the user what services are available in either cell, at what price, based on current bandwidth usage at the two locations. If the user was already using a service which became unavailable in the new cell, the system will advise the user and, if appropriate, put the service effectively on hold until the user enters a cell in which the service is available once more.

25 Claims, 5 Drawing Sheets

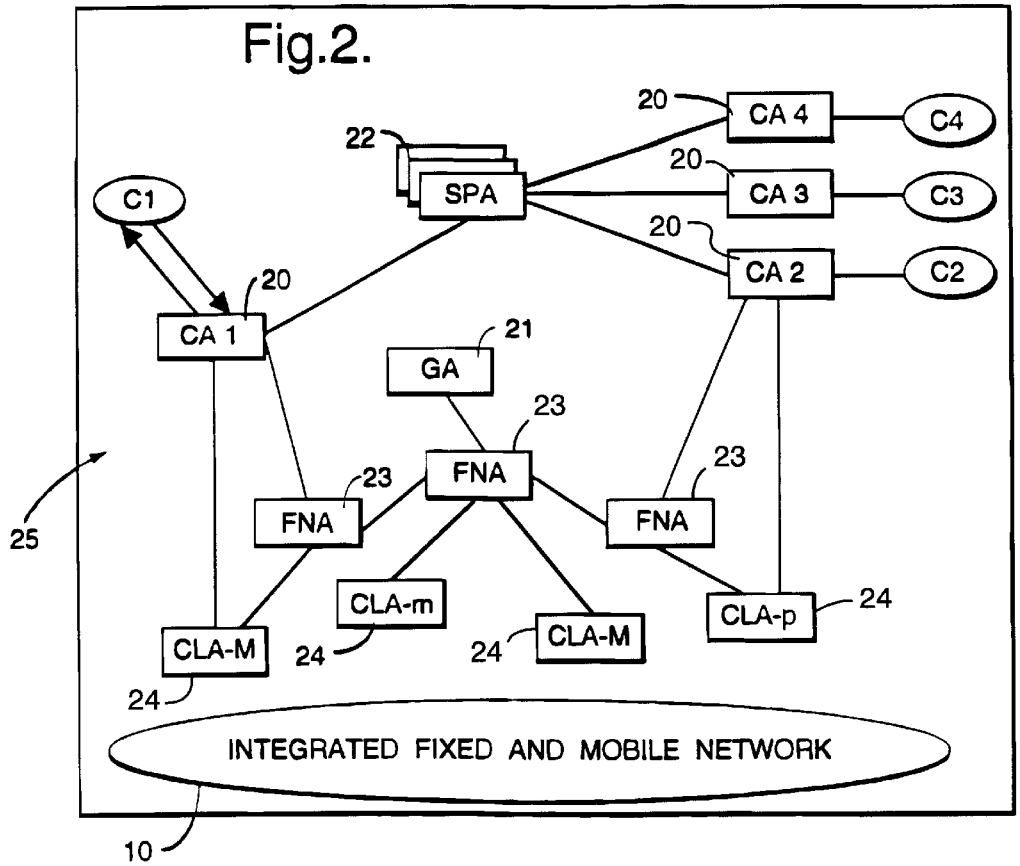
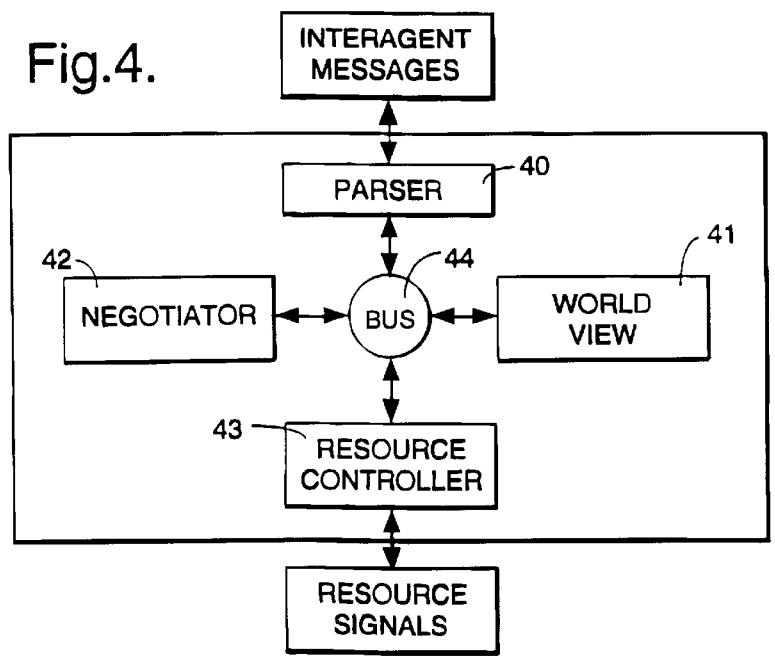

SERVICE PROVISION SYSTEM FOR COMMUNICATIONS NETWORKS

BACKGROUND OF THE INVENTION

The present invention relates to service provision in communications networks and finds particular application where a communications user is mobile.

FIELD OF THE INVENTION

Communication networks are growing increasingly complex as the information technology (IT) industry produces new and varied services to be offered to customers. The rapid provision of these services is expected to be a key feature in distinguishing different network operators. Competitive advantages can be gained by communications network operators through the services that they offer, and the efficiency with which they manage those services. The customers (users) do not want to be aware of network complexity, such as the relationship between fixed and mobile networks. All they want is simple access to any service, and this applies whether they are connected to a fixed network or using mobile facilities.

SUMMARY OF THE INVENTION

Embodiments of the present invention provide a service management system, which can be used in the provision of services to a mobile user by means of more than one network platform. In particular, embodiments of the present invention can be used to provide services by means of a combination of a fixed and a mobile communications network, in spite of the differing constraints such as the more limited bandwidth available in mobile networks.

It has been recognised, in making the present invention, that the use of "Cooperating Intelligent Software Agent" technology in a heterogeneous agent architecture can allow service management in a complex environment such as the above. The basis for this technology is described in general terms in the publication "Distributed Artificial Intelligence" by M Huhns, Volumes I and II, published by Pitman, Morgan and Kaufmann in 1987. Indeed, cooperating intelligent agents can be used to provide quality and flexibility of control sufficient to meet the demands of leading-edge IT services, in spite of problems presented by multiple network platforms with conflicting constraints.

Embodiments of the present invention can be described as having a distributed architecture based on specialised intelligent software systems, that is agents, which cooperate to provide a range of services, some of which may be novel, across a network platform provided by integration of, for instance, a mobile and a fixed network platform. Software agents for use in embodiments of the present invention can be designed to manage systems where there is a large amount of distributed information available and a large number of users with specific service requirements. Generally system management becomes more complex where users move between fixed and mobile networks while requiring/receiving services. This raises the problem of unifying the provisioning of services across various network platforms (mobile and fixed) and the effective management of the limited radio spectrum in contrast with the less constrained bandwidth in the fixed (broadband) networks.

A major problem foreseen with communications systems of the future is system complexity which is expected to limit the ability to exploit and reliably control communication networks. Intelligent agents used in embodiments of the present invention can achieve simplicity and robustness by spreading a control system over a plurality of specialised agents.

One type of agent provides the customer with an interface to manage the customer's interactions with the network, another cooperates to manage the network resources (cell bandwidth or capacity along the fixed network links) and a third type of agent facilitates specific services by linking network and customers together. As a result of agents interaction, intelligent services with special features that satisfy the customer and make better use of network resource, can be provided.

The agents accomplish their tasks by exploiting only local knowledge and using limited communications to inform each other of their actions and/or pass on knowledge. They negotiate with each other and by deciding the best option allocate tasks within the system. Their distributed nature makes them tolerant to both individual and multiple agent failure. This agent-based approach gives fast, robust and near-optimal solutions to resource allocation problems.

In addition to resource allocation, embodiments of the present invention also provide a mechanism by which service providers can make information available to customers. That information can be simply advertising-based but it can also provide a menu of information which is dynamically updated and from which the customer can select and activate service provision. The updating can take into account real-time constraints, such as bandwidth availability to a mobile customer, so controlling options selectable by the customer in accordance with the real time constraints.

The options selectable could be controlled by being present or absent from a menu, or could be controlled according to content. For instance, a service could be available at different prices depending on a real-time constraint such as overall demand on bandwidth in a particular cell of a radio network.

BRIEF DESCRIPTION OF THE DRAWINGS

A service provision system according to an embodiment of the present invention will now be described, by way of example only, with reference to the accompanying Figures in which:

FIG. 2 shows a schematic diagram of a system architecture for use in the service provision system described below;

FIG. 4 shows schematically the internal structure of an agent; and

DETAILED DESCRIPTION OF EXAMPLARY EMBODIMENTS

Figure 1:
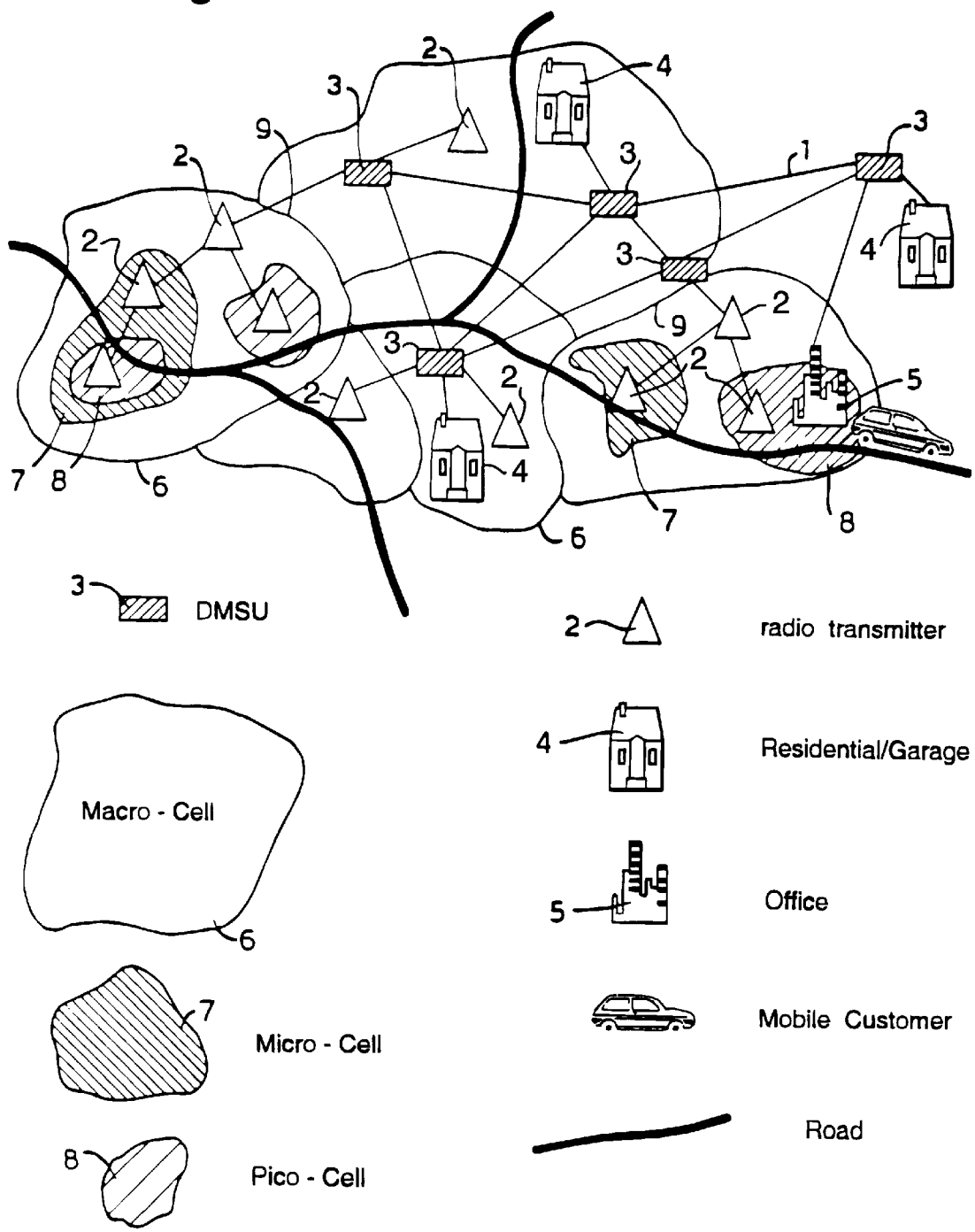
FIG. 1 shows an environment in which the service provision system would be advantageous.

Referring to FIG. 1, an environment in which the service provision system might be applied comprises a fixed communications network 1, which may for instance be a broadband network, in combination with radio transmitters 2 of a mobile network.

The fixed (broadband) network 1 is the main carrier of long distance traffic and is represented for the purposes of this example to consist solely of Digital Main Switching Units (DMSUs) 3 which are nearly fully interconnected. Houses 4, offices 5, other buildings etc. are assumed to be connected in known manner to an appropriate node of the fixed network 1.

The radio part of the network is arranged into large (~10 km diameter) macro cells 6 and smaller (~500 m diameter) micro cells 7. The former provide country wide coverage but a low bandwidth, the latter service local 'hotspots' with higher bandwidth available. Additional services are available through much higher bandwidth, small pico cells 8—typically only a few meters across. These are assumed to be located in offices 5 and at special location points such as garages, railways stations, motorway service stations, shopping centres etc. All radio cell transmitters 2 are connected in known manner to their local fixed network node.

The customer (user) may be mobile, travelling across cell boundaries 9 and requesting various services through his mobile handset, or may be at a fixed location having access to the integrated network through a terminal (ie videotelephone or computer terminal).

In this scenario, there will be at least one network provider involved, who provides and manages either one or both of the fixed and mobile networks concerned. There will also be at least one customer, who has access to one or both of the networks and may require services such as telephone calls or data provision, and at least one service provider. The service provider(s) may be independent of the network provider and merely provide services which are accessible by means of the network(s).

Normally any requested service will involve an end-to-end connection across the integrated network platform to another mobile/fixed customer or to a bank of data located anywhere in the network. For instance, the data might comprise any kind of stored information (text file, image file, manual page) that the customer would like to access for information retrieval or storage.

System Architecture

Referring to FIG. 2, the following describes a heterogeneous system architecture based on autonomous agents working cooperatively to solve various service management problems in the mobile and fixed integrated network (MFIN) 10, shown in FIG. 1.

The agents form a single layered system 25 using the underlying fixed network 1 for inter-agent communication.

The agents involved in the architecture can be grouped into three generic categories:

"Interface Agents" comprising Customer Agents (CA) 20 and Gateway Agents (GA) 21.
"Service Provider Agents" (SPAs) 22
"Network Management Agents" comprising Fixed Network Agents (FNA) 23 and Cell Agents (CLA) 24

A Customer Agent CA 20 generally mediates between the agent system 25 and a customer or service provider while a Gateway Agent GA 21 provides a link such as a port, or interface, between the agent system 25 and another intelligent or non-intelligent management system (not shown) owned by an independent telecom operator. Hence, GAs 21 facilitate the transfer of information or requests between the agent system 25 and the external world.

The Service Provision Agents 22 are each responsible for a specific service, managing information about the provider (s) of that service and negotiating with those providers who wish to sell their resources. In an example, a customer might require some specific data but that same data may be found at different locations. A Service Provider Agent 22 will be activated in finding the optimal location from which the data will be provided.

The Network Management Agents 23,24 are mainly responsible for managing resources in the fixed network (FNAs) 23 and in the mobile network (CLAs) 24. As shown in FIG. 2 the Cell Agents 24 can be of various types, depending on the type of cell they are managing: Macro Cell Agent (CLA-M), Micro Cell Agent (CLA-m) or Pico Cell Agent (CLA-p). The Network Management Agents 23,24 work cooperatively to collate their available local resources (i.e. link capacities and cell bandwidth) in a "resource configuration" required for a particular service. They also continuously update that resource configuration to deal with changes of delivery point for the service due to customer's mobility.

In principle, each agent is allowed to communicate with any other agent in the community with the exception of SPAs 22 which have communication channels only with Customer Agents (CAs). This provides a security measure in that SPAs 22 for service providers who are independent of the relevant network providers) are prevented from having direct access to network management or customer information. SPAs 22 are service-specific, and actual provision of a service to the system 25 is done by means of a CA 20. Hence, in practice, a CA 20 provides a customer request to an SPA 22 which then decides which other CA 20 (responsible for the resource required) should be contacted in providing the resource. Thereafter, the CAs 20 involved, the one providing the customer request and the one associated with the resource, contact the network management agents which will set up the service.

Agents communicate by passing messages of fixed format. Messages have the generic form: [To, From, Job_ID, Content]

'To' identifies the agent or list of agents the message is sent to, 'From' identifies the originator agent sending the message, "Job ID" is a marker used in tracking jobs through the system, and 'Content' is the inter-agent message. When receiving a message each agent makes its own decisions triggering an internal task and/or deciding to communicate with other agents sending or requesting information.

Agents' Internal Architecture

Referring to FIG. 4, the agents all have the following generic internal components: a parser 40, a world view 41 (database), a negotiator 42 (responsible for buying/selling resources), and a resource controller 43 (responsible for controlling the functional actions of the agent). These communicate by means of a common communication sytem or bus 44.

On receiving an incoming message from another agent, the parser 40 compares the message against standard templates to see which module should receive which message. For instance, a service_request would be processed by the negotiator 42 which would obtain information from the world view 41 on the status of the resource and the tasks the agent can perform. In comparison a service_acceptance would be passed to the resource controller 43 which would update the world view's record of active services.

The resource controller 43 handles all messages to and from the underlying resource system. For instance, when a customer comes into a new cell, a resource signal will come from the network to the resource controller 43 of a cell agent 24. An inform message, identifying a customer's location and associated pricing would then pass from the cell agent 24 to the parser 40 of a customer agent 20 and be handled by the World View 41 of the customer agent 20 to update the customer status. (This system is very similar to speech-act languages with "inform" and "uninform" affecting the internal database (World View) requests being passed to the negotiator and acree/unagree to the controller).

All the modules are conveniently written in an object-oriented language, in particular Prolog although certain functional elements in the negotiator 42 and the parsers 40 I/O facilities might be written in C for speed and ease of implementation.

The negotiator 42 has a number of pricing strategies built in that price in different fashions according to the stage of the negotiation and the amount of resource available against that offered. The effectiveness of each strategy, for instance in terms of its profit, can be used to drive the frequency with which a strategy is employed.

Network Management Agents 23,24

The role of network management agents is to manage, monitor and cost the provision of the basic network resources needed to provide a service. Each FNA 23 is responsible for managing a network node and each CLA 24 is responsible for managing a cell transmitter 2. The mapping between various types of network management agents and the physical integrated network is given in FIG. 3, where the M, m, p are identifiers for the Macro, micro and pico agents respectively.

i) Fixed Network Agent (FNA) 23

These agents manage the flow of data through a network node and its 25 associated links. (It should be noted that a node in this context is a switching unit, not shown, which is smaller than a DMSU 3. Multiple nodes may be connected to a single DMSU 3, and a single FNA 23 can manage more than one node).

Knowledge (stored & updated)
local network topology (links and node(s) managed)
neighbouring agents topology
active services along managed links
bandwidth usage
price-bandwidth table
Functions Performed
Monitor bandwidth usage along their managed physical links
Cooperate with other FNAs using a distributed routing algorithm to find the shortest available route in the fixed network for a requested service
Dynamic update of the route found through the fixed network on customer departure from the area managed by the FNA (that is, when a customer leaves the cells connected to the FNA and enters the area of another FNA)
Cooperate with the CA 20 to find not only the mobile customer location (i.e. in which cell) but also if that is the right cell in terms of bandwidth required for the service. This facility is used for intelligent downloading of data cached when the available cell bandwidth allows it.
Set up the service end-to-end connection merging the fixed network path with the radio paths to a customer's current cell
Control data caching at its site and then download it along the end-to-end connected path References are made above to "data caching". This covers the storing of data which a customer requires for transmission to the customer when the customer reaches a location at which downloading is possible. For instance, a customer may request a service requiring significant bandwidth at his/her location, and subsequently move to a location in which the bandwidth is no longer available, for instance by moving from a pico cell to a macro cell of a mobile network. The relevant data must therefore be cached until such time as the customer moves once more to a location where downloading is possible.

ii) Cell Agent (CLA) 24

Figure 3:
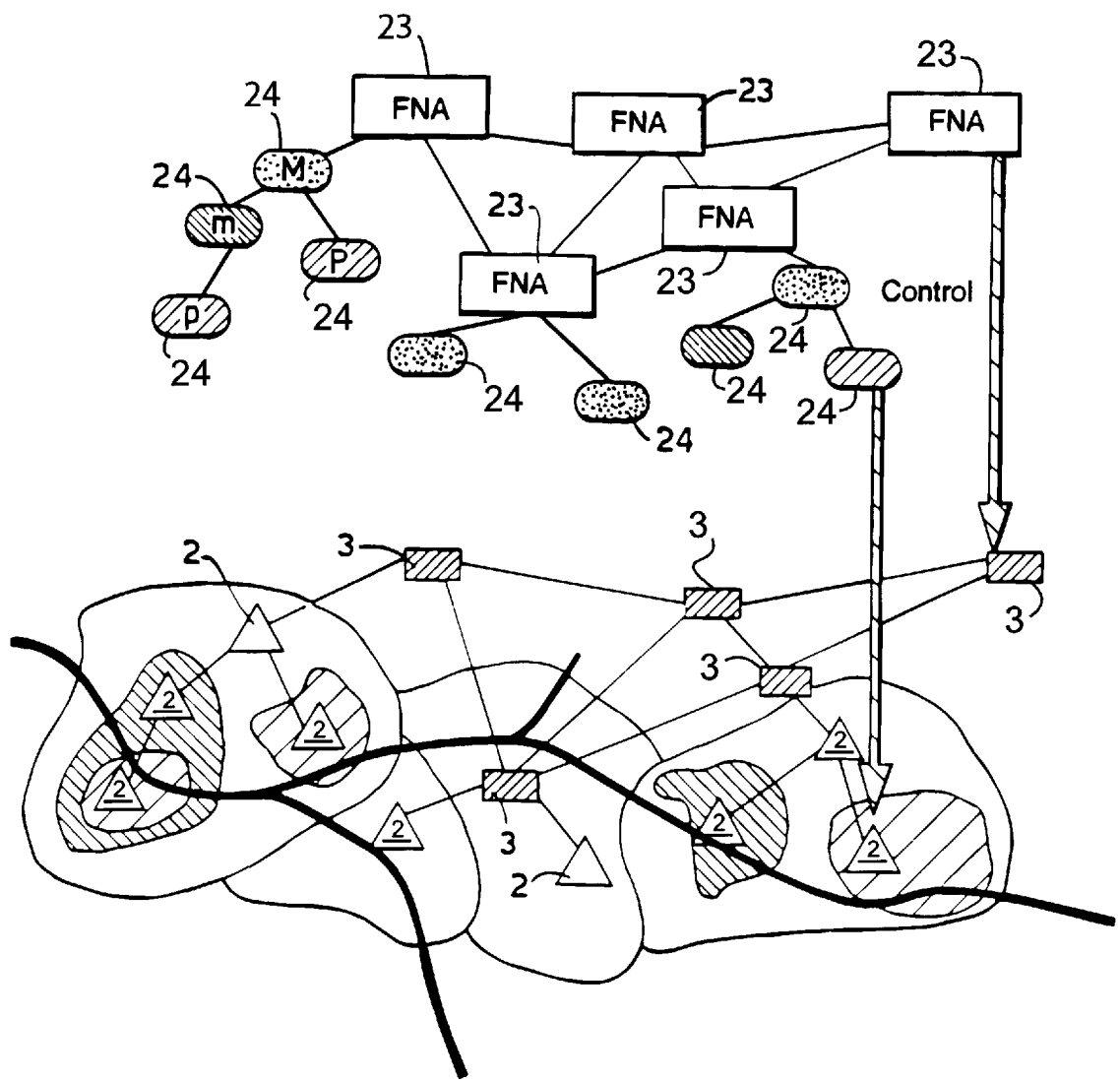
FIG. 3 shows schematically the relationship between network management software agents and a network over which they have control.

For each cell in the integrated physical network 10 there is a Cell Agent 24 controlling it. Macro cells are arranged so that each is connected to only one FNA 23. Micros and picos are all encapsulated in macros and are connected to the macro cell in which they are embedded. Similarly, in the event that a pico is embedded geographically inside a micro it is connected to that micro cell. As shown in FIG. 3, the cell agents 24 follow the same connectivity pattern as the cell transmitters 3.

Knowledge (stored & updated)
parent cell agent connected to
active services using that cell's bandwidth resources
Functions Performed
Monitor bandwidth usage inside the cell they manage
Dynamic price allocation based on current bandwidth usage level
Monitor customer entering/leaving the cell and signal the customer's presence to his Customer Agent 20 via the parent cell agent, if any, or via a FNA 23 if connected straight to an FNA agent.
Continuously offer resources to the Customer Agent 20. The message sent includes the following tuple:
[Customer_Agent, Path, Bits, Price]
where:
Path is the paths from the FNA 23, down to that cell agent.
Bits represents the available bandwidth on offer
Price is the desired selling price worked out by the cell agent The last function presented above is central to the system, creating the possibility for resource managers of the network providers to offer continuously available resources at variable price (depending on the current bandwidth usage) to potential customers and not only when those resources are required by a requested service. This increases the potential usage of network resources and implicitly creates new and flexible opportunities for the customer wanting to use those resources.

When a service is established (by negotiation with the resource managers) the service is implemented by the resource managers, on behalf of the network providers rather than the service providers. At this point, a data download for instance might make use of caching facilities provided by the fixed network.

Thus, the network management agents' job is to sell resource at a price that they dynamically allocate based on current bandwidth usage.

Interface Agents i) Customer Agent (CA) 20

The role of the Customer Agent 20 is also very important in the system. It provides a 'one interface per customer' facility for various types of customers.

A main role is to present and negotiate customer requests for services with the system. Another major role however, is to offer proactively various services to the customer when and where they become available to him/her.

Additionally, a customer may not only request a service but may also offer resources that other customers want to use (i.e. databases of information, people resources). The functions of the Customer Agent can be expanded to take this into account. The following provide examples of relevant customer agent types:
Personal Customer Agent (deals with a person offering services or capturing services requirements)
Database Customer Agent (manage data resources, sell data to other agents/customers)
Computer Customer Agents (manage processor resources, provision of on/off line computation power)

For the purposes of the present description, further details of the design/function requirements of the first two types of Customer Agent 20 are given below. (These are relevant to the descriptions of the system in use given under "Scenarios and Services" below.)

i) a Personal Customer Agent

Knowledge (stored & updated)

customer s current location customer's business profile (history of services requested by the customer, although this may be a facility of a future business agent which may be added to the current system)

generic range of services offered by the relevant operator payment requirements pre-input by the customer (optional)

billing and pricing information

Functions Performed customisable interface (one customer agent is created for each customer)

takes customer's request for service information and mediates the dialogue with the service provider agents (SPA) 22 sending information back to the customer receives resource offers at a certain price from the network management agents 23, 24 and matches them against the range of services deciding which services can be provided to the customer allocates prices to services based on the price of network resources on offer and weights them in accordance to customer's business profile offers those services to the customer (i.e. sends available service information (Service_Type, Price) to appear as distinctive icons on the customer's mobile handset display: the customer deciding to take advantage of the service offer then has only to select the relevant icon)

after taking in the customer request for a service, puts it forward to the service provider agent 22 (eg Road Map Provision agent) and then sends a request to the relevant network management agents 23, 24 for service set-up)

all incoming services are checked by a CA 20 before contacting the customer (to take account of call blocking, priority interruptions)

while a service is active and the customer is moving the Customer Agent continuously sends messages updating customer's current location to the network management agents 23, 24 for route (of the service) update Monitor Service quality (if there is not enough bandwidth for that service in the current customer's cell, the CA 20 receiving the resource offer from the cell may decide to downgrade the service—e.g. video link to audio—if this is agreed by the customer, or use the caching facility, in the case of data transfer to the customer, to put the service on hold till a new 'valid' bandwidth offer arrives from another cell the customer moves into)

take customer request to cancel the service and inform the other agents responsible for the service (i.e. the network management agents 23, 24 to release the bandwidth previously used in the service).

In the early stages these agents will check a request against internal criteria, price it by business directed pricing and establish contacts with the resource management agents to build the service. Later generations will learn patterns of customer behaviour, price services to stimulate revenue inside the constraints set by business agents and negotiate the best rate for the necessary resources.

i)b Database Customer Agent

The Database Customer Agent is the interface attached to any bank of data that the system may facilitate access to, for various other personal customers.

Knowledge (stored & updated)

Database location and its connectivity to the physical network generic range of items offered by the database generic payment information current utilisation of database resources Functions Performed allocate prices to database services based on the current utilisation of data resources offer those priced services in response to the service provider agent's request after being chosen by the service provider agent 22 as a source of data, the Customer agent 20 sends a request to the relevant network management agent 23, 24 (closest FNA 23) for data caching when it receives the network management agent (closest FNA 23) acknowledgement the Database Customer Agent validates the transfer of data to be cached at FNA 23 site.

ii) Gateway Agent (GA)

Gateway agents translate between systems, effectively providing a language translator enabling different systems to negotiate. If the other system is not intelligent and does not negotiate, the gateway agent can act as a shell providing an intelligent interface. Note this suggests one gateway agent per network interface.

Service Provision Agents 22

Service provision agents 22 are not a generic family. Each type of service that can be offered is operated by a service provision agent. Their job is to provide the link between services and network. For simple point-to-point services such an agent is relatively simple. However by breaking service provision down in this way we can provide intelligence where it is needed. A service provision agent 22 can buy and sell (negotiate for) data, computing resources, people or network bandwidth from the customer agents interfacing with such resources or from network management agents.

This enables the provision in a simple fashion of new intelligent services. Rather than describe all the possible details of such agents, a typical example is given below as the SPA agent used below in the "Intelligent Services" scenario.

Knowledge (stored & updated)

Engineers it is managing

Customers registered with the service

Generic payment information

List of customers in need of service

Know where data on cars is located

Functions Performed request time-distance to customer from engineers match engineers to customers inform engineers of next job buy car repair data to pass to engineers in need This service provision agent provides the network operator effectively with two customers—the person who is requesting the service and the company (service provider) who runs the breakdown service. Service provision agents 22 can act on behalf of more than one network customer.

Scenarios and Services

The following three scenarios have been chosen to demonstrate use of the service provision system described above.

Interactive Service Provision In this scenario a customer with a telephone moves between different types of radio cells. The underlying network equipment will detect such cell changes in known manner and update its location records. A resource signal is then directed from the network to the resource controller of the new cell agent 24.

The cell agent 24 for the cell to which the customer moved examines the current traffic load in the cell and uses an algorithm to select a capacity and price for use of the cell's facilities. It then offers this capacity-price tuple to the customer agent 20 of that customer. The customer agent 20 then checks the range of services that the customer has subscribed to, including any price limits the customer has requested, checks the price offered by the cell against any current business strategies for pricing calls and offers a list of service-price tuples to the customer's phone unit. These might best be displayed as icons on a display of the phone unit, with the appropriate associated pricing, or in any other suitable manner.

"Current business strategies" in this context are strategies of the service provider which may affect the service-price tuples produced. An example of such a strategy might be where the service provider offers a customer a bulk rate for a service where the customer's usage goes above an agreed threshold.

The services offered will vary from cell to cell, with available capacity. A point-to-point continuous service that is extant on crossing a cell boundary but which requires more capacity than is then available, in the new cell, or which would require a significant increase in cost (say a video call on moving into a macro cell from a micro), will be either downgraded by the customer agent to a lower call type, or will show an increased cost. Data services which do not require a continuous link are managed differently (see "Intelligent Data Services" below). The services displayed can include normal telephony, compressed video, full video, one-touch emergency services and two data download services, for instance.

Figure 5:
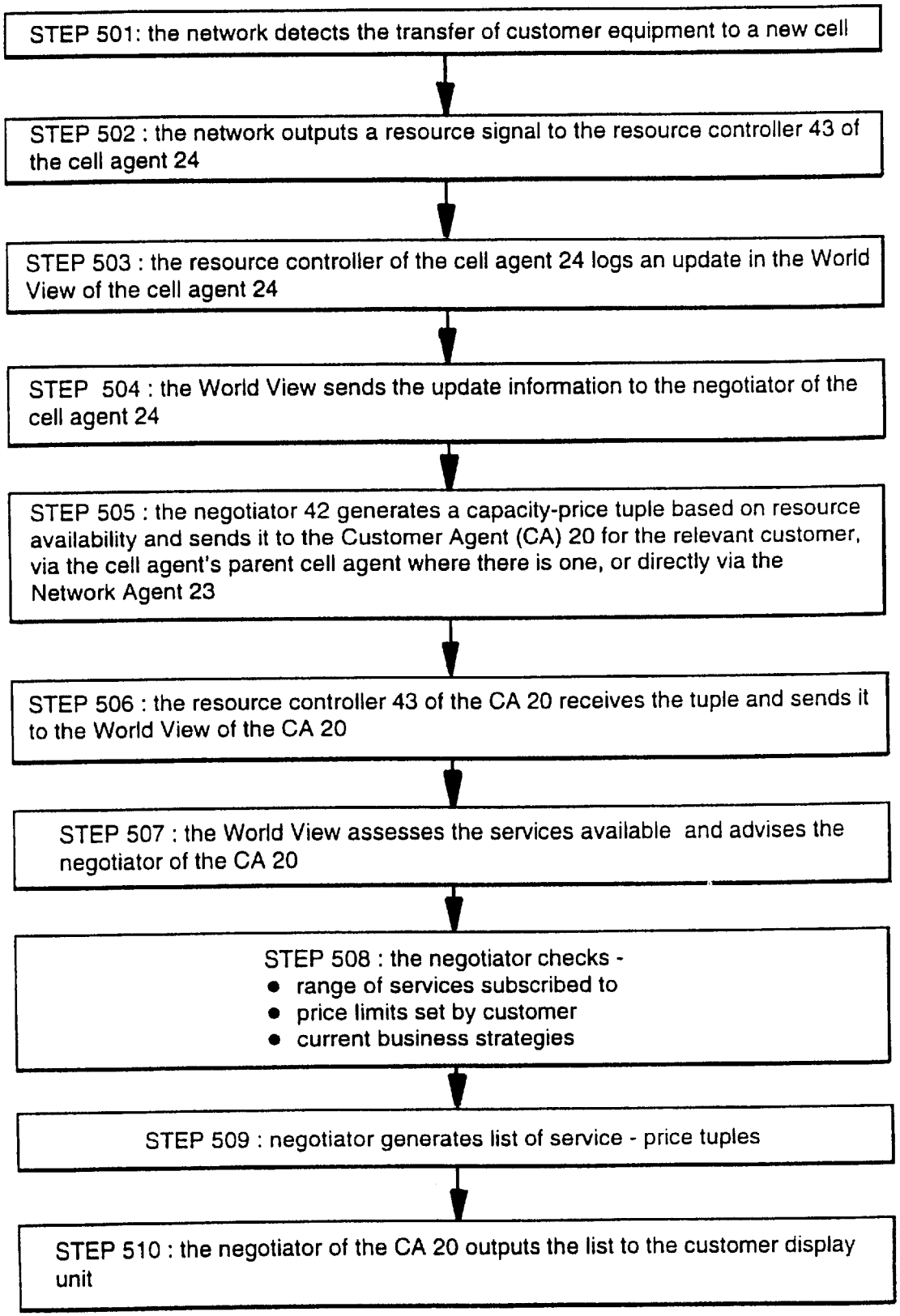
FIGS. 5, 6 and 7 show flow diagrams for three different scenarios for use of the service provision system.

Referring to FIG. 5, the above can be described with reference to a flow diagram:

STEP 501: the network detects the transfer of customer equipment to a new cell
STEP 502: the network outputs a resource signal to the resource controller 43 of the cell agent 24
STEP 503: the resource controller of the cell agent 24 logs an update in the World View of the cell agent 24
STEP 504: the World View sends the update information to the negotiator of the cell agent 24
STEP 505: the negotiator 42 generates a capacity-price tuple based on resource availability and sends it to the Customer Agent (CA) 20 for the relevant customer, via the cell agent's parent cell agent where there is one, or directly via the Network Agent 23
STEP 506: the resource controller 43 of the CA 20 receives the tuple and sends it to the World View of the CA 20
STEP 507: the World View assesses the services available and advises the negotiator of the CA 20
STEP 508: the negotiator checks—
  range of services subscribed to
  price limits set by customer
  current business strategies
STEP 509: negotiator generates list of service-price tuples
STEP 510: the negotiator of the CA 20 outputs the list to the customer display unit The components of the various agents can be seen from the above to deal generally with operations which are relevant to different operations of the overall system. For instance, the World View deals with data-related operations, the resource controller with physical resource-related operations and the negotiator with pricing operations. However, the boundaries between the types of operation performed by each component may be defined appropriately and may well be different in different circumstances.

The above scenario shows in particular the interworking between network and customer agents.

Intelligent Data Services

In the following scenario, the customer and network agents 20, 23, 24 combine to download data intelligently. A customer has requested a data download, for instance from an information source to his computer, or road maps to his video phone etc. Clearly, it is preferable to the customer that this is done quickly and cost effectively. The parameters on either could have been set by the customer. For instance, the customer might specify that he wants data to be downloaded at 64 Kbit/s. He may however move to a typical macro cell, offering only a voice channel (8 Kbit/s). The system can be set such that the data is then retrieved, and cached by a fixed network agent (FNA) 23, but not sent yet to the customer.

In practice, the fixed network agent will generally be loaded onto computer facilities of some sort, and these facilities will generally offer storage capacity. It is to this storage capacity that the data will be cached, the FNA 23 treating it as an available physical resource equivalent to a network resource.

The network agent 24 requests that the customer agent 20 inform it as soon as the customer is in a cell with the right price-capacity values. That is, it effectively sets a flag in the World View 41 of the CA 20 which will be triggered by information coming in from a new CLA 24. Once informed, the network agent 23 downloads as much data as possible until the customer agent 20 informs it that the customer is again changing cells. The data connection thus tracks the user round the system, exploiting the available capacity (or price) as available.

Figure 6:
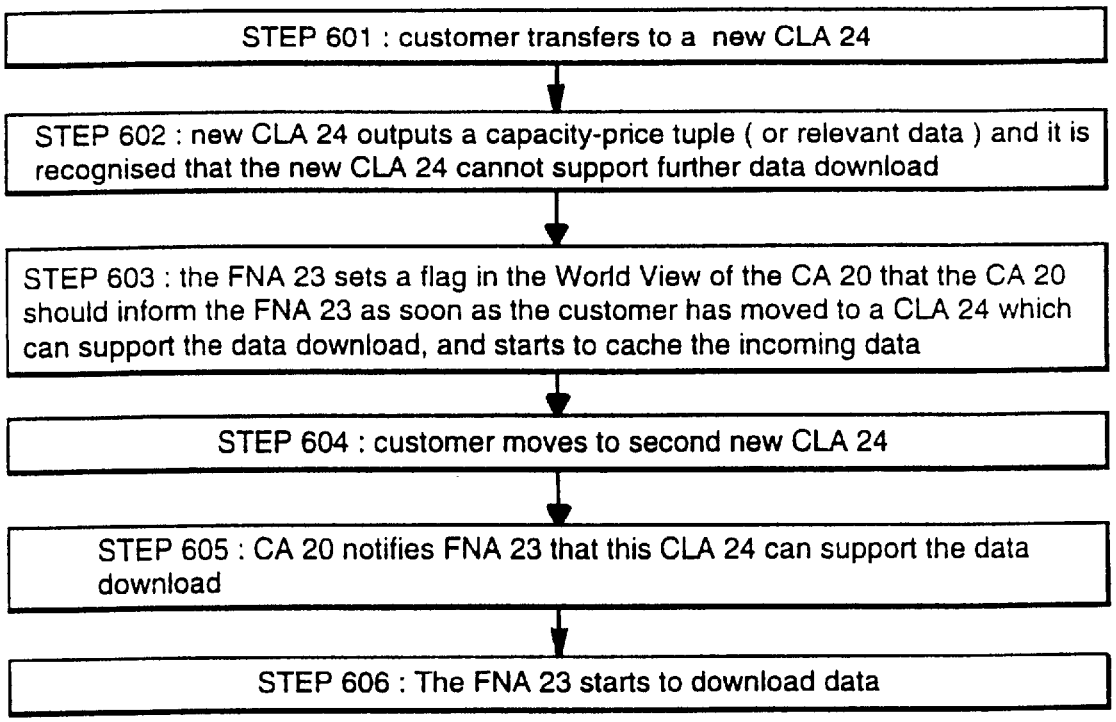

Referring to FIG. 6, this can b e described in terms of the following flow diagram steps:

STEP 601: customer transfers to a new CLA 24
STEP 602: new CLA 24 outputs a capacity-price tuple (or relevant data) and it is recognised that the new CLA 24 cannot support further data download
STEP 603: the FNA 23 sets a flag in the World View of the CA 20 that the CA 20 should inform the FNA 23 as soon as the customer has moved to a CLA 24 which can support the data download, and starts to cache the incoming data
STEP 604: customer moves to second new CLA 24
STEP 605: CA 20 notifies FNA 23 that this CLA 24 can support the data download
STEP 606: The FNA 23 starts to download data It may be that the customer will actually move to a cell associated with a new Network Agent 23. In this case, when the flag is triggered and the original network agent 23 is notified, it will recognise that the new cell agent (CLA) 24 is not one of its own. The original NA 23 will then interrogate one or more NAs to which it is connected, which may in turn have to interrogate other Nas, until an NA 23 which recognises the new CLA 24 is located. The original NA 23 will then hand over all the relevant information that it holds to the new NA 23.

Intelligent Services

A third scenario demonstrates intelligent service agents. Their job is to coordinate customer agents 20 and network resources as appeared in the previous scenario. In this scenario they demonstrate value-added intelligence of their own.

A customer is in a car which breaks down. He touches the "emergency breakdown" icon on his screen. The call is connected to a service provider agent (SPA) 22 which requests location and fault description. The service provider agent 22 manages a group of engineers in the field. It interrogates their customer agent 20 with whom each engineer logs his current job status. The service provider agent 22 negotiates with the customer agent to find an engineer who can most quickly be directed to the job then downloads the information required to the engineer. The service provider agent 22 thus acts on behalf of two customers the broken down customer and the engineer agency. Such network intelligence could be used for any dispatch service which involves scheduling. Currently it is implemented as a reactive, negotiation based service but alternative algorithms could be implemented.

The main features of this service are:

Provides a complete application for scheduling engineers

One touch service to customer—no numbers to remember

Can be expanded to range of services with the intelligence in the network

Each service has a dedicated service agent—easy to produce new services.

Figure 7:
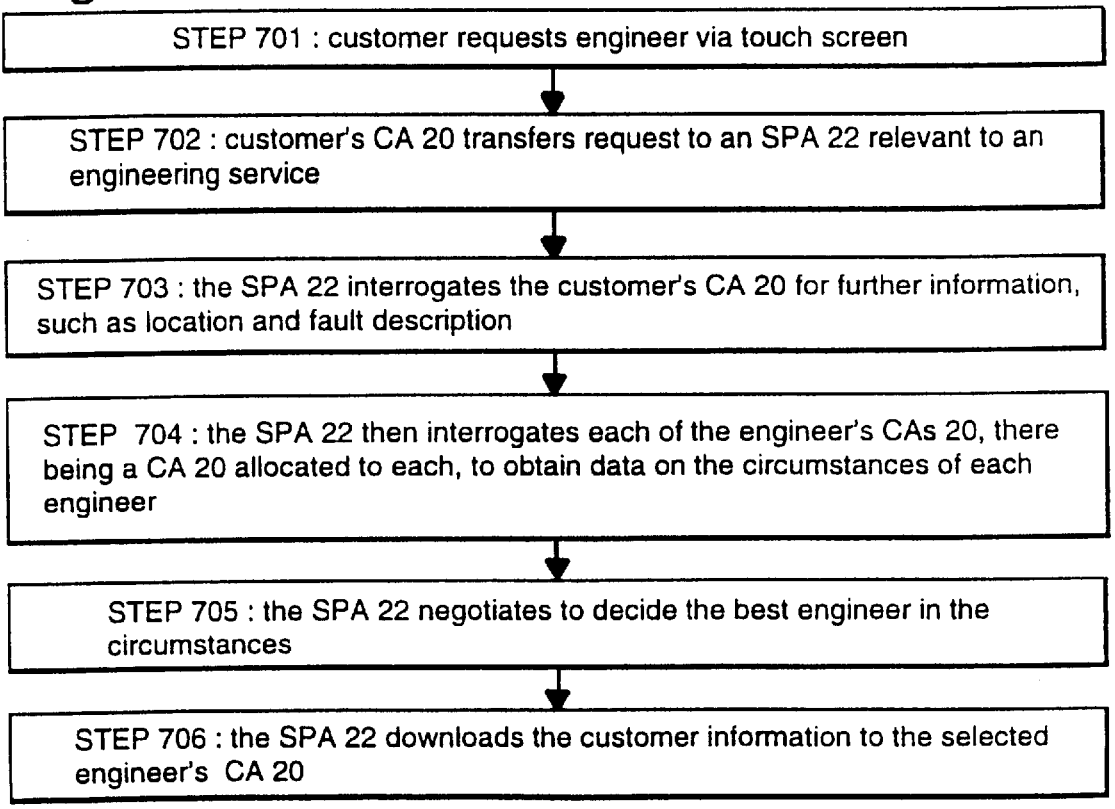

Again, this service can be expressed in terms of a flow diagram. Referring to FIG. 7, the steps are:

STEP 701: customer requests engineer via touch screen

STEP 702: customer's CA 20 transfers request to an SPA 22 relevant to an engineering service STEP 703: the SPA 22 interrogates the customer's CA 20 for further information, such as location and fault description STEP 704: the SPA 22 then interrogates each of the engineer's CAs 20, there being a CA 20 allocated to each, to obtain data on the circumstances of each engineer STEP 705: the SPA 22 negotiates to decide the best engineer in the circumstances STEP 706: the SPA 22 downloads the customer information to the selected engineer's CA 20

It will be clear to a person skilled in this technology that there are several novel and advantageous aspects of a system as described above which might be used, independently or in combination with other aspects. For instance, it is advantageous that, in a system as set out in claim 1 below, it is possible to embed updatable business strategies, for instance reflecting special pricing packages of the service or network provider.

Further, it is advantageous that a service provider, as described in relation to FIG. 7, can automatically optimise a service offer, by taking into account for instance real-time location and availability of personnel or equipment which represent alternative sources of that service provider's service.

What is claimed is:

1. A service provision system for use with a communications network to provide a plurality of services to a network user, wherein data relevant to the plurality of services can be made available to the user dependent upon the location of the user within the network, and the user can select one or more services to be provided, said system including control means comprising a plurality of software agents, individual agents of said plurality comprising data relevant to service provision the network, updating means for updating data held by at least some of said software agents on a point-by-point continuous basis as the user changes location within the network, the control means maintaining and communicating the updated data made available to the user and responsive to selection of a service by the user to trigger a process for providing the selected service to the user.

2. A system according to claim 1 wherein said communications network comprises at least in part a mobile communications network and the user has access to said mobile network.

3. A system according to claim 2 wherein the control means is responsive to transfer of the user between cells of the mobile network, said cells having different resources to offer in respect of services to the user, to update data made available to the user which is affected by said transfer.

4. A system according to claim 3 wherein at least one of the services potentially available to the user is affected by bandwidth availability in the cell in which the user has access to the mobile network, and the control means may update the data available to the user in terms of either availability of such service or the price at which it would be available.

5. A system according to either of claim 3 or 4 wherein at least one of the services potentially available to the user involves the downloading of data to the user, which downloading is affected by bandwidth availability in cells of the mobile network, said system further comprising means to store data requested by the user as a consequence of selecting a service, the control means controlling downloading of said data to the user such that it is stored at times that bandwidth is not available for said downloading, and downloaded subsequently when bandwidth becomes available.

6. A system according to claim 5 wherein the control means includes means for tracking the location of the user with respect to the mobile network for the purpose of downloading the data to the user by means of appropriate routing through the communications network or networks.

7. A system according to claim 1 wherein the data relevant to the plurality of services includes real-time pricing data such that the user can take the real-time pricing data into account prior to selecting a service.

8. A system according to claim 1 wherein:

a plurality of said individual agents are each allocated a facility for offering a common service, each of said plurality of individual agents holding real-time data in respect of its allocated facility's capacity to offer the service, and the system selects one of the allocated facilities on which to base notification to the user of current conditions under which a service might be provided.

9. A system according to claim 1 wherein at least one of said agents comprises means for storing an updatable business strategy, and the system accesses said business strategy prior to making cost-related service data available to a user, such that said business strategy can be applied to said cost-related service data to modify the data appropriately.

10. A service provision system for use with a communications network including a mobile communications sub-network to provide a plurality of services to a network user having access to the mobile sub-network, wherein data relevant to the plurality of services can be made available to the user, dependent upon the location of the user within the network and the user can select one or more services to be provided, said system comprising:

control means including a plurality of software agents inter-communicating with one another via commonly formatted messages, individual agents of said plurality including data relevant to service provision via the network, and updating means for updating data held by at least some of said software agents on a point-by-point continuous basis as the user changes location within the network, the control means controlling the updated data made available to the user and responsive to selection of a service by the user to trigger a process for providing the selected service to the user via the mobile sub-network.

11. A system as in claim 1 wherein:

the control means is responsive to transfer of the user between cells of the mobile network, said cells having different resources to offer in respect of services to the user, to update data made available to the user which is affected by said transfer.

12. A system as in claim 11 wherein:

at least one of the services potentially available to the user is affected by bandwidth availability in the cell in which the user has access to the mobile network, and the control means may update the data available to the user in terms of either availability of such service or the price at which it would be available.

13. A system as in claim 11 wherein:

at least one of the services potentially available to the user involves the downloading of data to the user, which downloading is affected by bandwidth availability in cells of the mobile network, said system further comprising means to store data requested by the user as a consequence of selecting a service, the control means controlling downloading of said data to the user such that it is stored at times that bandwidth is not available for said downloading, and downloaded subsequently when bandwidth becomes available.

14. A system as in claim 13 wherein:

the control means includes means for tracking the location of the user with respect to the mobile network for the purpose of downloading the data to the user by means of appropriate routing through the communications network or networks.

15. A system as in claim 10 wherein:

data relevant to the plurality of services includes real-time pricing data such that the user can take the real-time pricing data into account prior to selecting a service.

16. A system as in claim 10 wherein:

a plurality of said individual agents are each allocated a facility for offering a common service, each of said plurality of individual agents holding real-time data in respect of its allocated facility's capacity to offer the service, and the system selects one of the allocated facilities on which to base notification to the user of current conditions under which a service might be provided.

17. A system as in claim 10 wherein:

at least one of said agents comprises means for storing an updatable business strategy, and the system accesses said business strategy prior to making cost-related service data available to a user, such that said business strategy can be applied to said cost-related service data to modify the data appropriately.

18. A method of service provision for use with a communications network including a mobile communications sub-network to provide a plurality of services to a network user having access to the mobile sub-network, wherein data relevant to the plurality of services can be made available to the user dependent upon the location of the user within the network, and the user can select one or more services to be provided, said method comprising:

using a plurality of object-oriented software agents intercommunicating with one another via commonly formatted messages to maintain data relevant to service provision via the network, updating data held by at least some of said software agents via said commonly formatted messages on a point-by-point continuous basis as the user changes location within the network, and controlling the updated data made available to the user and responsive to selection of a service by the user to trigger a process for providing the selected service to the user via the mobile sub-network.

19. A method as in claim 18 wherein:

the transfer of the user between cells of the mobile network having different resources to offer in respect of services to the user causes update data to be made available to the user which is affected by said transfer.

20. A method as in claim 19 wherein at least one of the services potentially available to the user is affected by bandwidth availability in the cell in which the user has access to the mobile network, and wherein:

the data available to the user is updated in terms of either availability of such service or the price at which it would be available.

21. A method as in claim 19 wherein at least one of the services potentially available to the user involves the downloading of data to the user, which downloading is affected by bandwidth availability in cells of the mobile network, said method further comprising:

storing data requested by the user as a consequence of selecting a service, and controlling downloading of said data to the user such that it is stored at times that bandwidth is not available for said downloading, and downloaded subsequently when bandwidth becomes available.

22. A method as in claim 21 further comprising:

tracking the location of the user with respect to the mobile network for the purpose of downloading the data to the user by means of appropriate routing through the communications network.

23. A method as in claim 18 wherein:

data relevant to the plurality of services includes real-time pricing data such that the user can take the real-time pricing data in to account prior to selecting a service.

24. A method as in claim 18 wherein:

a plurality of said individual agents are each allocated a facility for offering a common service, each of said plurality of individual agents holding real-time data in respect of its allocated facility's capacity to offer the service, and the system selects one of the allocated facilities on which to base notification to the user of current conditions under which a service might be provided.

25. A method as in claim 18 wherein:

at least one of said agents stores an updatable business strategy, and the system accesses said business strategy prior to making cost-related service data available to a user, such that said business strategy can be applied to said cost-related service data to modify the data appropriately.

* * * * *

(12) EX PARTE REEXAMINATION CERTIFICATE (9498th)
United States Patent
Busuioc et al.

(10) Number: US 6,151,309 C1
(45) Certificate Issued: Jan. 29, 2013

(54) SERVICE PROVISION SYSTEM FOR COMMUNICATIONS NETWORKS

(75) Inventors: Marius-Nicolae Busuioc, Ipswich (GB); Richard J. Titmuss, Colchester (GB); Christopher S. Winter, Ipswich (GB)

(73) Assignee: British Telecommunications Public Limited Company, London (GB)

Reexamination Request:
No. 90/012,345, Jun. 11, 2012

Reexamination Certificate for:
Patent No.: 6,151,309
Issued: Nov. 21, 2000
Appl. No.: 08/732,321
Filed: Jan. 22, 1997

(21) Appl. No.: 90/012,345
(22) PCT Filed: Apr. 28, 1995
(86) PCT No.: PCT/GB95/00988
§ 371 (c)(1), (2), (4) Date: Jan. 22, 1997
(87) PCT Pub. No.: WO95/30317
PCT Pub. Date: Nov. 9, 1995

(30) Foreign Application Priority Data

Apr. 28, 1994 (EP) .................................... 94303092

(51) Int. Cl.
*H04W 4/00* (2009.01)

(52) U.S. Cl. ..................................... 370/328; 455/422.1
(58) Field of Classification Search ........................ None
See application file for complete search history.

(56) References Cited

To view the complete listing of prior art documents cited during the proceeding for Reexamination Control Number 90/012,345, please refer to the USPTO's public Patent Application Information Retrieval (PAIR) system under the Display References tab.

*Primary Examiner* — Eron J Sorrell

(57) ABSTRACT

A services management system can provide services to a mobile user, via a combination of network platforms. The system uses "Co-operating Intelligent Software Agent" technology in a heterogeneous agent architecture to provide enough flexibility to deal with changing network constraints, for instance as the user moves. In an example, a fixed broadband network might be used in combination with radio transmitters of a mobile network. The agent architecture, involving autonomous agents working co-operatively, forms a layered system using the underlying fixed network for inter-agent communication. In an application, a mobile user might move from a cell of the mobile network which can provide relatively wide bandwidth to one which can only provide limited bandwidth. The service management system can advise the user what services are available in either cell, at what price, based on current bandwidth usage at the two locations. If the user was already using a service which became unavailable in the new cell, the system will advise the user and, if appropriate, put the service effectively on hold until the user enters a cell in which the service is available once more.

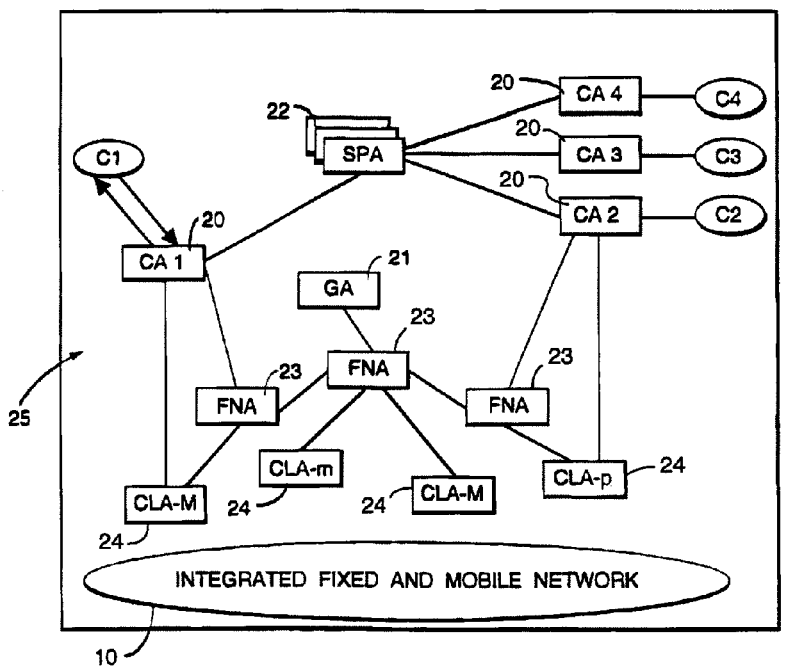

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-25 is confirmed.

* * * * *